United States Patent
Franke et al.

(10) Patent No.: US 6,769,402 B2
(45) Date of Patent: Aug. 3, 2004

(54) METHOD FOR KNOCK REGULATION IN AN INTERNAL COMBUSTION ENGINE

(75) Inventors: Steffen Franke, Brentwood (GB); Oskar Torno, Schwieberdingen (DE); Axel Heinstein, Wimsheim (DE); Carsten Kluth, Stuttgart (DE); Werner Haeming, Neudenau (DE); Michael Baeuerle, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 10/220,681

(22) PCT Filed: Feb. 22, 2001

(86) PCT No.: PCT/DE01/00675
§ 371 (c)(1),
(2), (4) Date: Jan. 3, 2003

(87) PCT Pub. No.: WO01/65110
PCT Pub. Date: Sep. 7, 2001

(65) Prior Publication Data
US 2003/0154958 A1 Aug. 21, 2003

(30) Foreign Application Priority Data
Mar. 1, 2000 (DE) .......................................... 100 09 779

(51) Int. Cl.$^7$ ................................................ F02F 5/00
(52) U.S. Cl. .............................. 123/406.16; 123/406.29
(58) Field of Search ...................... 123/406.16, 406.2, 123/406.11, 406.13, 406.14, 406.21, 406.29, 406.37

(56) References Cited

U.S. PATENT DOCUMENTS

| | | | | |
|---|---|---|---|---|
| 3,937,014 A | * | 2/1976 | Plant ............................ | 60/243 |
| 4,049,957 A | * | 9/1977 | Kera et al. ..................... | 714/10 |
| 4,697,566 A | | 10/1987 | Ohnari et al. | |
| 5,144,929 A | * | 9/1992 | Hosoya et al. ......... | 123/406.21 |
| 6,474,302 B2 | * | 11/2002 | Takahashi et al. ..... | 123/406.21 |

FOREIGN PATENT DOCUMENTS

| | | |
|---|---|---|
| DE | 35 39 407 | 5/1987 |
| DE | 43 00 929 | 1/1994 |
| DE | 197 09 395 | 9/1998 |
| FR | 2 694 341 | 2/1994 |

* cited by examiner

Primary Examiner—Mahmoud Gimie
(74) Attorney, Agent, or Firm—Kenyon & Kenyon

(57) ABSTRACT

A method for knock control of an internal combustion engine, a knock detection being carried out on the cylinders of the internal combustion engine and a moment of ignition being retarded by a specifiable value as a function of detected knocking combustion in at least one of the cylinders, the system including at least two evaluation electronics and at least one cylinder being assigned to each of these evaluation electronics, and the knock sensor signals assigned to the cylinders being evaluated by the evaluation electronics assigned in each case, and the knock detection and the specification of the moment of ignition being effected by a control electronics, and the evaluation electronics being monitored for functionality. It is provided that, upon detection of a malfunction of at least one of the evaluation electronics, the at least one cylinder assigned to this evaluation electronics is linked to the control of at least one cylinder having intact evaluation electronics.

10 Claims, 1 Drawing Sheet

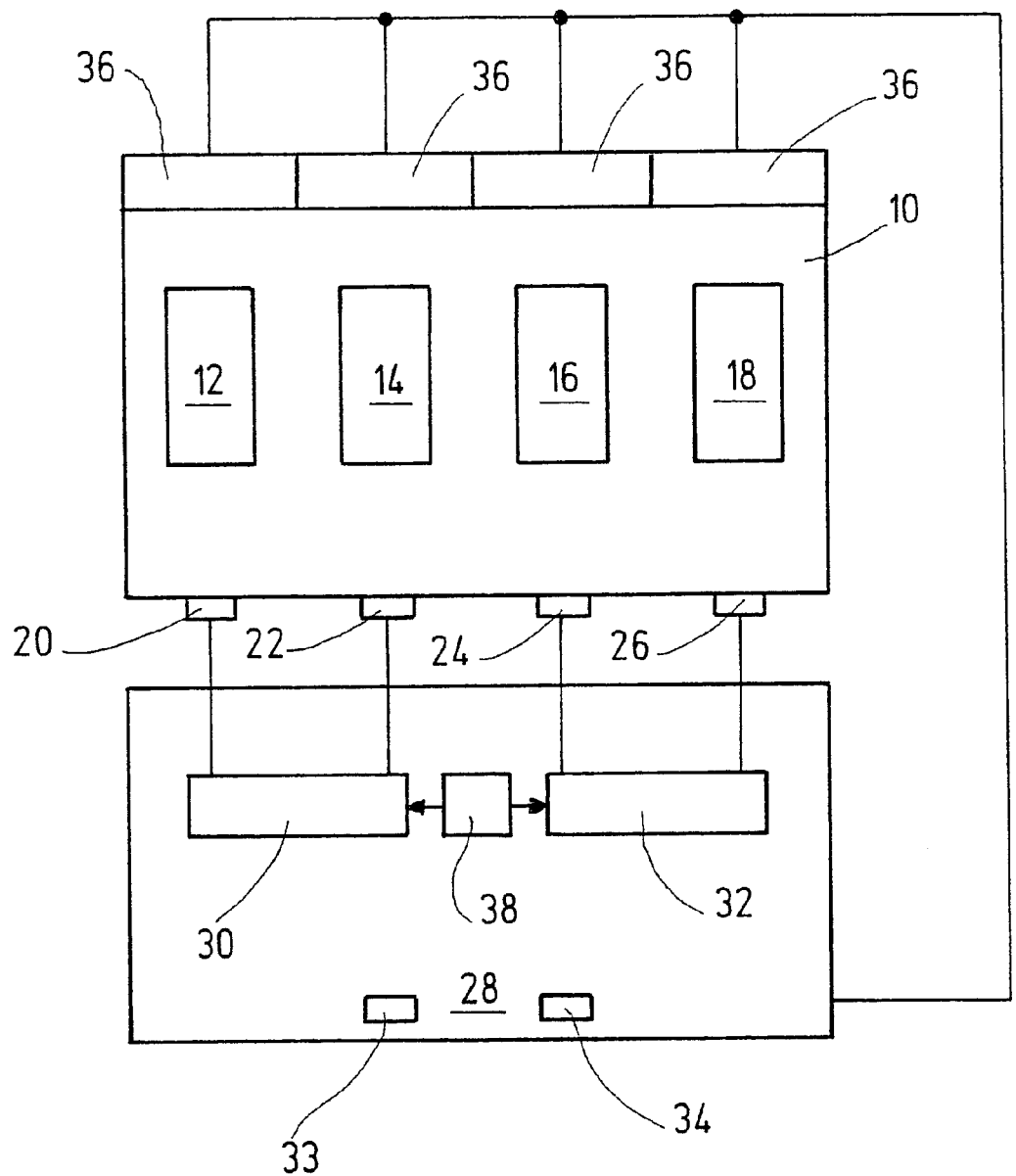
Fig.

METHOD FOR KNOCK REGULATION IN AN INTERNAL COMBUSTION ENGINE

FIELD OF THE INVENTION

The present invention relates to a method for knock control in an internal combustion engine.

BACKGROUND INFORMATION

Carrying out a so-called knock control in internal combustion engines is known in the art. In so doing, a combustion process in the cylinders of the internal combustion engine is monitored for knocking combustion. Knocking combustion is identified by characteristic vibrations that may be detected using so-called knock sensors which are mounted on the housing of the internal combustion engine. Knocking combustion is, for example, a function of the quality of a fuel being used, the compression of the fuel/air mixture in the cylinders and/or the moment of ignition. The ignition timing is retarded by a specifiable amount as a function of the detected knocking combustion. Since retarding the ignition timing leads to loss of torque and increased fuel consumption, running the internal combustion engine as close as possible to a so-called knock limit is known in the art. The knock control in this case runs the internal combustion engine as close as possible to the knock limit. Here, the ignition timing is controlled according to the actual signals determined by the knock sensors.

Detecting knock using knock sensors, which are typically designed as structure-borne noise sensors, is known in the art. The use of ionic current sensors or pressure sensors is also conceivable. At least one cylinder of the internal combustion engine is assigned to each of these knock sensors. The control unit has two evaluation electronics to which the sensors are assigned, and by which the sensor signals are evaluated in a cylinder-specific manner. The evaluation circuit supplies the result of the preprocessed sensor signals to a control electronics, which typically is integrated within an engine control unit. Here, knocking of the individual cylinders is detected, and the ignition angle retard and moment of ignition are calculated.

During normal use of the knock control, the evaluation electronics are continually monitored for correct functioning by a diagnostic. If a malfunction is determined, the system automatically switches to safety knock control to prevent damage to the internal combustion engine. This safety knock control provides that of a safety retard of the ignition timing is implemented for all cylinders of the internal combustion engine. However, in this context, it is disadvantageous that whenever the moment of ignition, and thus the ignition angle, is retarded away from the optimal ignition angle, the efficiency and the power output of the internal combustion engine are reduced, thereby increasing fuel consumption. In turbo-charged internal combustion engines, retarding the moment of ignition may cause the charging-air pressure to drop, which can lead to power losses of up to 40%.

SUMMARY OF THE INVENTION

The method according to the present invention offers the following advantage: in the event of a failure or malfunction of an evaluation electronics of the knock control, a safety retard of the moments of ignition is not necessary for all cylinders of the internal combustion engine. Since, upon detecting a malfunction of at least one of the evaluation electronics, the at least one cylinder assigned to this evaluation electronics is linked to the control of at least one cylinder with intact evaluation electronics, all cylinders of the internal combustion engine are advantageously not automatically switched to the maximum safety retard, but rather the at least one cylinder to which the malfunctioning evaluation electronics circuit is assigned is guided by another cylinder of the internal combustion engine whose evaluation electronics is in working order. This ensures that the cylinders with operational evaluation electronics may still be operated using an optimal moment of ignition, while only the at least one cylinder with malfunctioning evaluation electronics is operated with retarded ignition timing which, however, is below the previously known safety ignition retard. The overall result is that the efficiency of the internal combustion engine is only insignificantly impaired. In particular, this guidance of the cylinder having defective evaluation electronics makes it possible to operate the cylinder close to its knock limit even if its evaluation electronics malfunction.

If an evaluation electronics circuit fails, a guide cylinder function is activated for the cylinders assigned to this evaluation electronics. This means that the cylinders of the defective evaluation electronics are guided by cylinders of an intact evaluation electronics. The central control electronics (engine control unit) detects knocking, chooses which cylinders assume guidance of the cylinder assigned to the failed evaluation electronics, and calculates the resulting ignition retard. Only if all evaluation electronics are detected as defective is a uniform safety ignition retard activated for all cylinders.

For the guide cylinder function, at least one cylinder of an intact evaluation electronics is selected as the guide cylinder. The ignition angle settings of the at least one guided cylinder are derived from those of the at least one guide cylinder. This preferably results in several possibilities. Thus, an ignition angle setting of the guided cylinder may be the same as the ignition angle of the guide cylinder. Furthermore, it is preferred if the ignition angle setting of at the least one guided cylinder corresponds to an ignition angle setting of the at least one guide cylinder plus a safety offset (timing retard away from the knock limit).

Another preferred embodiment of the present invention provides that the retard of the ignition angle for the at least one guided cylinder is made in one step following a knock event at the guide cylinder. Furthermore, it is preferred if the retard for the at least one guided cylinder is effected in several small steps following a knock event in the at least one guide cylinder.

Finally, it is preferable if the cylinder which uses the greatest retard of the ignition timing is established as the guide cylinder. Finally, it is also preferred if, during initialization of the control electronics and the evaluation electronics, respectively, it is determined which cylinders may be used as the guide cylinder in the particular groups assigned to an evaluation electronics.

BRIEF DESCRIPTION OF THE DRAWING

The drawing schematically shows a knock control of an internal combustion engine.

DETAILED DESCRIPTION

The figure schematically shows an internal combustion engine 10, that includes a total of four cylinders 12, 14, 16 and 18. A knock sensor 20, 22, 24 and 26 is assigned to each of cylinders 12, 14, 16 and 18. The knock sensors detect structure-borne noise vibrations that are caused by combustion in cylinders 12, 14, 16 and/or 18. Knock sensors 20, 22, 24, 26 are connected to evaluation electronics 30 and 32. In this context, evaluation electronics 30 is assigned to knock sensor 20 and knock sensor 22, and evaluation electronics 32 is assigned to knock sensor 24 and knock sensor 26. Evaluation electronics 30 and 32 are implemented using either digital, analog or mixed technology. Evaluation electronics 30 or 32 are integrated within an engine control unit 28 to which are fed the signals supplied and preprocessed by knock sensors 20, 22, 24, 26. Engine control unit 28 includes, among other things, at least one microprocessor 33 and at least one memory medium 34 in which control algorithms for components 36 that influence the combustion in cylinders 12, 14, 16 and 18 are stored. Components 36 are, for example, final controlling elements for adjusting an ignition of internal combustion engine 10.

A diagnostic module 38 is assigned to evaluation electronics 30 and 32 and permanently monitors the functionality of evaluation electronics 30 and 32 during their specified use. Diagnostic module 38 is implemented in engine control unit 28. The diagnostic module may be implemented physically by the at least one microprocessor 33 that processes an appropriate routine.

The knock control schematically depicted in the Figure illustrates the following function:

During the operation of internal combustion engine 10, the combustion in individual cylinders 12, 14, 16 and 18 is continually monitored via knock sensors 20, 22, 24 and 26. According to structure-borne vibrations picked up in this context, a control parameter is specified for components 36 via evaluation electronics 30 and 32 and data control unit 28, so that knocking combustion in cylinders 12, 14, 16 and 18 is suppressed. Using the control parameters, cylinders 12, 14, 16 and 18 in this case are operated close to their knock limit.

Evaluation Electronics 32 and 34 are continually monitored for functionality by diagnostic module 38 (control unit 28). If there is a malfunction, for example, in evaluation electronics 30, it is detected by diagnostic module 38. Then diagnostic module 38 causes a guide cylinder function to be activated for the knock control of cylinders 12, 14. In this way, cylinders 12, 14 are guided by the cylinders assigned to evaluation electronics 32. Due to this measure, cylinders 16 and 18 continue to be operated with optimum knock control via evaluation electronics 32. Simultaneously, a guide cylinder function is activated for the knock control of cylinders 12, 14 so that they also continue to be operated in knock-controlled fashion. The overall result is that cylinders 16 and 18 are run with optimal knock control, while cylinders 12 and 14 may be operated relatively close to their knock limit, despite a defect in evaluation electronics 30, assigned to them. Cylinders 12 and 14 are thus guided by cylinders 16 and 18. Due to this guidance, none of cylinders 12, 14, 16 and 18 of internal combustion engine 10 have to be driven using the safety retard of the ignition timing and be subject to the related previously-mentioned disadvantages. The overall result is a clear improvement in power output and efficiency of internal combustion engine 10 when evaluation electronics 30 is defective.

According to additional exemplary embodiments (not shown), each of cylinders 12, 14, 16 and 18 may obviously be assigned its own evaluation electronics that may correspondingly be switched over in the event of a fault. Also, for internal combustion engines 10 that have more then four cylinders, corresponding cylinder groups may each be assigned to an evaluation electronics.

Furthermore, it may be provided that not every cylinder 12, 14, 16, 18 is monitored via its own knock sensor 20, 22, 24, 26. In this case, one knock sensor may also be assigned to a plurality, for example, two cylinders.

What is claimed is:

1. A method for knock control of an internal combustion engine, comprising:

performing a knock detection on cylinders of the internal combustion engine, a knock sensor signal being produced for each cylinder;

retarding a moment of ignition by a specifiable value as a function of a detected knocking combustion in at least one of the cylinders;

causing at least two evaluation electronics to evaluate the knock sensor signals, at least one of the cylinders being assigned to each of the at least two evaluation electronics;

causing a control electronics to effect the knock detection and a specification of the moment of ignition;

monitoring a functionality of the at least two evaluation electronics; and upon a detection of a malfunction of at least one of the at least two evaluation electronics, linking the at least one cylinder assigned to the at least one evaluation electronics with the malfunction to a control of at least one of the cylinders assigned to an intact one of the at least two evaluation electronics.

2. The method as recited in claim 1, further comprising:

in the event of a failure of one of the at least two evaluation electronics, those of the cylinders assigned to the failing evaluation electronics are guided by cylinders associated with another one of the at least two evaluation electronics.

3. The method as recited in claim 1, wherein:

at least one of the cylinders includes a guide cylinder and remaining ones of the cylinders are guided cylinders, and from one of an ignition angle and a timing retard of the guide cylinder, the ignition angle is specified from which ignition angles of the guided cylinders are derived.

4. The method as recited in claim 3, wherein:

the one of the ignition angle and the timing retard of the guide cylinder is used for the guided cylinders.

5. The method as recited in claim 1, wherein:

one of the cylinders is a guide cylinder, remaining ones of the cylinders are guided cylinders, and a retard of an ignition angle is effected for the guide cylinder and for the guided cylinders in response to a knock event in a guide cylinder.

6. The method as recited in claim 5, wherein:

one of the cylinders is a guide cylinder, remaining ones of the cylinders are guided cylinders, and a safety offset is applied away from a knock limit to an ignition angle of the guide cylinder to determine ignition angles of the guided cylinders.

7. The method as recited in claim 5, further comprising:

retarding an ignition timing of the guided cylinders in a plurality of small steps following the knock event in the guide cylinder.

8. The method as recited in claim 5, further comprising:

retarding an ignition timing of the guided cylinders in a single step following the knock event in the guide cylinder.

9. The method as recited in claim 5, wherein:

the guide cylinder corresponds to one of the cylinders that has one of a largest, a smallest, and an average retard of the ignition angle of the guide cylinder.

10. The method as recited in claim 5, wherein:

the guide cylinder includes one of the cylinders that is determined in an initial setting of the ignition system.

* * * * *